United States Patent Office 3,457,255
Patented July 22, 1969

1

3,457,255
NOVEL RIBO AND LYXO NUCLEOSIDE DERIVATIVES AND A PROCESS FOR THEIR PREPARATION
Gordon H. Jones, Mountain View, and John G. Moffatt, Los Altos, Calif., assignors to Syntex Corporation, Panama, Panama, a corporation of Panama
No Drawing. Filed May 17, 1967, Ser. No. 639,057
Int. Cl. A61k 27/00; C07d 51/50
U.S. Cl. 260—211.5          23 Claims

ABSTRACT OF THE DISCLOSURE

3′-deoxyribonucleoside-3′-en-5′-aldehydes and α-L-lyxonucleoside-5′-aldehydes in the pyrimidine, 6-azapyrimidine, purine and 8-azapurine series are prepared from the corresponding ribonucleoside-5′-aldehydes having a protecting group at the 2′,3′-positions. These novel aldehydes are then reduced with a metal borohydride to afford 3′-deoxyribonucleoside-3′-enes and α-L-lyxonucleosides, respectively. Alternatively, the 3′-deoxyribonucleoside-3′-en-5′-aldehydes and the 3′-deoxyribonucleoside-3′-enes are catalytically reduced to afford respectively (3′-deoxy-α-L-threo-dialdopentofuranosyl)nucleosides and (3′-deoxy-α-L-threo-pentofuranosyl)nucleosides together with their β-D-erythro isomers. These novel nucleoside derivatives are potent anti-metabolic and anti-bacterial agents against a variety of organisms, and certain derivatives are valuable in the synthesis of naturally occurring nucleosides.

---

This invention relates to novel ribo and lyxo nucleoside derivatives and a novel process for their properation. More particularly, this invention relates to novel 3′-deoxyribonucleoside-3′-en-5′-aldehydes [(3′-deoxy-β-D-glycero-dialdopent-3′-enofuranosyl)nucleosides], 3′-deoxyribonucleoside-3′-enes [(3′-deoxy-β-D-glycero-pent-3′-enofuranosyl)nucleosides], α-L-lyxonucleoside-5′-aldehydes [(α-L-threo-dialdopentofuranosyl)nucleosides], α-L-lyxonucleosides [(α-L-threo-pentofuranosyl)nucleosides], (3′-deoxy-α-L-threo-dialdopentofuranosyl)nucleosides [3′-deoxy-α-L-lyxonucleoside-5′-aldehydes], and

2

(3′-deoxy-α-L-threo-pentofuranosyl)nucleosides [3′-deoxy-α-L-lyxonucleosides] having the formulas:

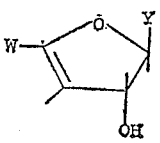      and      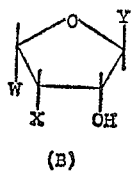

(A)                                    (B)

wherein

W is formyl or hydroxymethyl;
X is hydroxy or hydrogen; and
Y is a pyrimidine or purine base.

The term "pyrimidine base," as used herein, means an unsubstituted or substituted pyrimidine or 6-azapyrimidine group wherein the point of attachment to the ribose unit is through the one position of the pyrimidine group. The term "purine base," as used herein, means an unsubstituted or substituted purine or 8-azapurine group wherein the point of attachment to the ribose unit is through the nine position of the purine group. Thus, the term "pyrimidine or purine base" is inclusive of the nitrogen analogs, i.e. members of the 6-azapyrimidine and 8-azapurine series.

The novel nucleoside derivatives of Formulas A and B are potent anti-metabolic and anti-bacterial agents and are useful against a variety of organisms, e.g. *Staphylococcus aureus*, *Proteus vulgaris*, *Klebsiella pneumoniae* and *Escherichia coli*. For this reason, the novel derivatives can be employed for cleaning glassware and instruments used in the growing of tissue cultures in tumor research. In addition, the derivatives of Formula A are useful as chemical intermediates in the preparation of certain naturally occurring nucleosides and various structural analogs thereof, e.g. 3′-deoxyadenosine of known biological importance. In addition, the compounds of Formula B, wherein X is hydrogen, are more potent anti-metabolic and anti-bacterial agents than their corresponding 4′-epimers.

The novel derivatives of Formula A are prepared in accordance with the following reaction sequence as shown in Chart A:

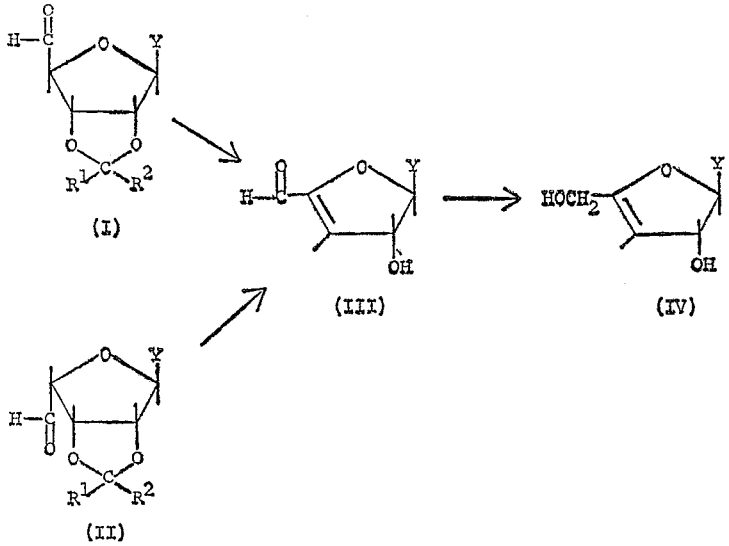

Chart A wherein

R¹ is hydrogen, lower alkyl or aryl;
R² is lower alkyl or aryl;
R¹ and R² together is tetramethylene or pentamethylene; and
Y is as defined hereinabove.

As used herein, the term "lower alkyl" means a straight or branched chain hydrocarbon group or up to six carbon atoms inclusive, such as methyl, ethyl, isopropyl, amyl, and the like. The term "aryl" means an unsubstituted or substituted phenyl group, said substituted phenyl group containing one or more halo, alkyl, nitro or methoxy substituents, such as p-methoxyphenyl and the like.

In the practice of the process as outlined in Chart A, contact of the ribonucleoside-5'-aldehyde of Formula I in an inert solvent with an active adsorbent substrate, e.g. on a column of the substrate, at room temperature, affords a mixture containing epimeric ribonucleoside-5'-aldehydes of Formulas I and II and a novel 3'-deoxyribonucleoside-3'-aldehyde of Formula III. Inert organic solvents particularly useful for this reaction are ethyl acetate, chloroform and the like. Active adsorbent substrates particularly useful for the above transformation include alumina, magnesia-silica gel, silica gel, and the like. Preferably, the contact is effected in chloroform on a silica gel column for a period of 48 to 96 hours, after which the products are eluted from the column. The 3'-deoxyribonucleoside-3'-en-5'-aldehyde of Formula III is readily separated from the epimeric mixture of aldehydes of Formulas I and II by column chromatography.

Reduction of the thus-obtained 3'-deoxyribonucleoside-3'-en-5'-aldehyde of Formula III which an alkali metal borohydride such as sodium borohydride, potassium borohydride or the like, an inert organic solvent such as methanol, ethanol or the like, at room temperature for a period of 5 to 60 minutes, affords a novel 3'-deoxyribonucleoside-3'-ene of Formula IV.

As an alternative to the method described hereinabove, the ribonucleoside-5'-aldehyde of Formula I is treated with a solution of a basic reagent in an inert organic solvent at room temperature for a period of 15 to 60 minutes to afford the novel 3'-deoxy-ribonucleoside-3'-en-5'-aldehyde of Formula III. Basic reagents particularly useful for the reaction include sodium hydroxide, sodium bicarbonate, sodium carbonate, potassium carbonate, and the like; and an alkali metal alcoholate such as sodium methoxide, potassium t-butoxide, sodium isopropoxide, and the like. The inert organic solvents particularly useful in preparing a basic solution are low molecular weight alcohols, preferably secondary or tertiary alcohols such as isopropanol, t-butanol and the like; and aprotic dipolar solvents such as dimethylformamide, dimethyl sulfoxide and the like. Preferably, the basic solution is selected from the group sodium carbonate in dimethylformamide, potassium t-butoxide in t-butanol, sodium isopropoxide in isopropanol and potassium t-butoxide in dimethyl sulfoxide.

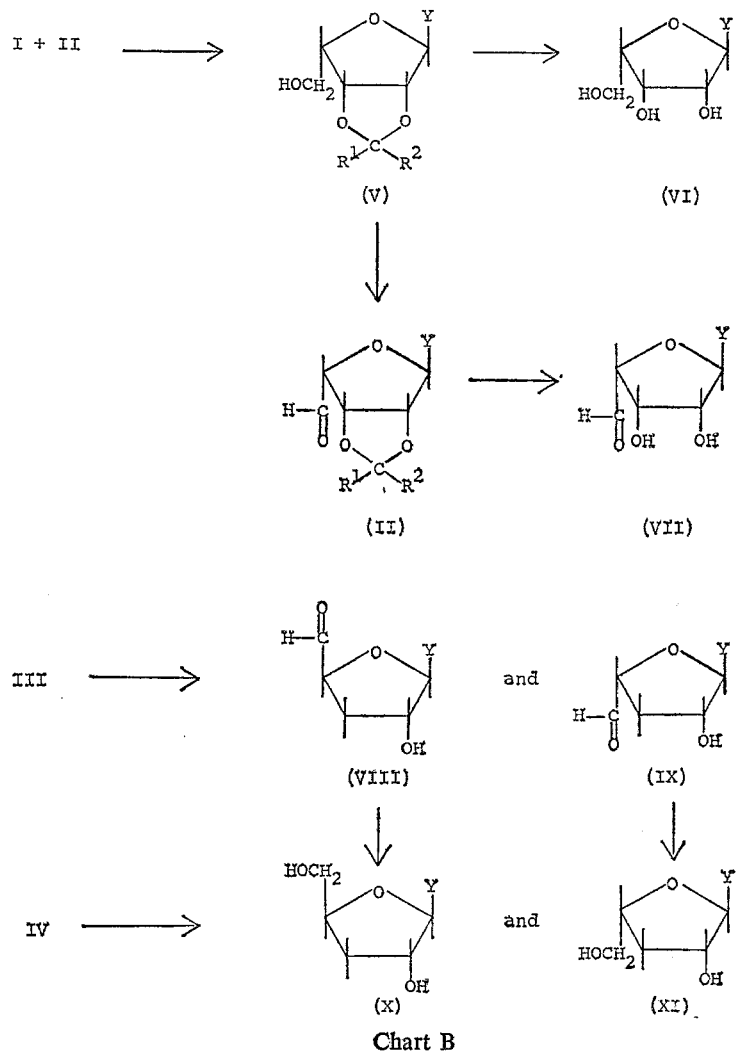

Chart B

Whereas the concentration of the basic reagent in the inert organic solvent is not critical, a solution containing at least one mole of the basic reagent per mole of ribonucleoside-5′-aldehyde of Formula I is required.

As a second alternative to the method described hereinabove, the ribonucleoside-5′-aldehyde of Formula I is contacted with the active adsorbent substrate which has previously been washed with the basic solution as mentioned hereinabove, to afford the novel 3′-deoxyribonucleoside-3′-en-5′-aldehyde of Formula III.

In each of the alternatives, the thus-obtained 3′-deoxyribonucleoside-3′-en-5′-aldehyde of Formula III is reduced, as described hereinabove, to the novel 3′-deoxyribonucleoside-3′-ene of Formula IV.

The novel derivatives of Formula B are prepared in accordance with the reaction sequence as shown in Chart B wherein all substituents are as described hereinabove.

In the practice of the process as outlined in Chart B, the novel derivatives of Formula B are prepared from (1) the epimeric mixture of aldehydes of Formulas I and II; (2) the 3′-deoxyribonucleoside-3′-en-5′-aldehyde of Formula III; and (3) the 3′-deoxyribonucleoside-3′-ene of Formula IV.

The epimeric mixture of aldehydes of Formulas I and II is reduced by treatment with an alkali metal borohydride such as sodium borohydride, potassium borohydride or the like, in an inert organic solvent such as methanol, ethanol and the like, at room temperature, for a period of ten minutes to about one hour, to afford a novel α-L-lyxonucleoside, having a protecting group at the 2′,3′-positions of Formula V. Preferably, the epimeric mixture of aldehydes is reduced with sodium borohydride in ethanol for a period of about 30 minutes. The novel α-L-lyxonucleoside, having a protecting group at the 2′,3′-positions, is readily isolated by chromatography.

Acid hydrolysis of the thus-obtained α-L-lyxonucleoside, having the protecting group intact, of Formula V, with an acid such as aqueous acetic acid, hydrochloric acid, formic acid, an acid-form resin (sulfonated polystyrene beads cross-linked with 8% divinylbenzene), and the like, at a temperature of about 25° C. to the reflux temperature of the acid for a period of about ten minutes to about 24 hours, removes the protecting group and affords a novel α-L-lyxonucleoside of Formula VI. Preferably, the acid hydrolysis is effected with 80% aqueous acetic acid at a temperature of about 100° C. for one hour for the removal of a benzylidene protecting group or at a temperature of about 37° C. for 16 hours for the removal of a p-anisylidene protecting group.

As an alternative to the above procedure, first the epimeric mixture of aldehydes can be reduced and second the protecting group can be removed and then the material can be chromatographed to afford the novel α-L-lyxonucleoside of Formula VI.

Oxidation of the α-L-lyxonucleoside, having the protecting group at the 2′,3′-position, of Formula V, in accordance with the method described in U.S. Patent 3,248,380, affords a novel α-L-lyxonucleoside-5′-aldehyde, having the protecting group at the 2′,3′-positions of Formula II. For example, oxidation is effected with dicyclohexyldicarbodiimide, and an acid catalyst such as dichloroacetic acid, orthophosphoric acid or pyridinium trifluoroacetate in dimethyl sulfoxide solution at room temperature for a period of about six hours.

Subsequent removal of the protecting group of the thus-obtained α-L-lyxonucleoside-5′-aldehyde of Formula II by acid hydrolysis, as described hereinabove, affords a novel α-L-lyxonucleoside-5′-aldehyde of Formula VII.

Catalytic hydrogenation of the 3′-deoxyribonucleoside-3′-en-5′-aldehyde of Formula III in the presence of a palladium catalyst in a solvent such as water, ethyl acetate, methanol, ethanol, and the like or mixtures thereof, at room temperature for a period of about 30 minutes to about four hours, affords a mixture of a novel (3′-deoxy-β - D - erythro - dialdopentofuranosyl) - nucleoside of Formula VIII and a novel (3′-deoxy-α-L-threodialdopentofuranosyl)nucleoside of Formula IX. Palladium catalysts particularly useful for this hydrogenation are palladium on an inert support such as a palladium-charcoal catalyst, palladium-barium sulfate catalyst, and the like. Preferably, the 3′-dexoyribonucleoside-3′-en-5′-adlehyde is hydrogenated in water:methanol and in the persence of a 10% palladium-barium sulfate catalyst for about two hours.

Reduction of the thus-obtained mixture of novel aldehydes of Formulas VIII and IX with an alkali metal borohydride such as sodium borohydride, potassium borohydride or the like, in an inert organic solvent such as methanol, ethanol or the like, at room temperature for a period of about ten minutes to about four hours, affords a mixture of the known 3′-deoxy-β-D-ribonucleoside of Formula X and a novel (3′-deoxy-α-L-threo-pentafuranosyl)-nucleoside of Formula XI. The mixture of 3′-deoxynucleosides of Formulas X and XI is conveniently separated by chromatography.

Catalytic hydrogenation, as described hereinabove, of the 3′-deoxyribonucleoside-3′-ene of Formula IV, affords a mixture of the known 3′-deoxy-β-D-ribonucleoside of Formula X and a novel (3′-deoxy-α-L-threo-pentofuranosyl)nucleoside of Formula XI. The mixture is conveniently separated by chromatography.

In the practice of the processes, as shown in Charts A and B, a particularly useful protecting group for the reactions described therein, is a benzylidene group, i.e. ($R^1$,$R^2$=H, phenyl), a p-anisylidene group, i.e.

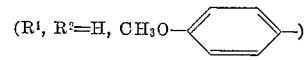

a cyclopentylidene group, i.e.

($R^1$, $R^2$ together=—$(CH_2)_4$—)

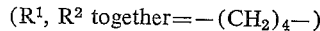

a cyclopentylidene group, i.e.

($R^1$, $R^2$ together =—$(CH_2)_4$—)

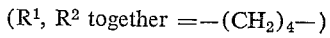

or a cyclohexylidene group, i.e. ($R^1$, $R^2$=—$(CH_2)_5$—). Preferably, the protecting group is benzylidene or p-anisylidene.

An illustrative but by no means exhaustive listing of pyrimidine and purine bases includes: uracil-1-yl, cytosin-1 - yl, 4 - chloro - 1,2 - dihydropyrimidin - 2 - on - 1 - yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin - 1 - yl, 4 - chloro - 6 - aza - 1,2 - dihydropyrimidin-2-on-1-yl, 6-azathymin-1-yl, hypoxanthin-9-yl, adenin-9-yl, 6-dimethylaminopurin-1-yl, 6-chloropurin-9-yl, guanin-9-yl, xanthin-9-yl, 2,6-dichloropurin-9-yl, 2,6-bis(methylamino)purin-9-yl), 8-azaadenin-9-yl, and 8-azaguanin-9-yl.

The starting materials of Formula I are obtained by oxidation of an appropriately protected ribonucleoside in accordance with the procedure in U.S. Patent 3,248,380.

The following examples serve to illustrate the present invention and should not be construed as a limitation on the scope of the present invention.

Example 1

To a solution of 3.3 g. of 2′,3′-O-benzylideneuridine in 25 ml. of anhydrous dimethyl sulfoxide are added 6.2 g. of dicyclohexylcarbodiimide, 0.8 ml. of pyridine and 0.4 ml. of trifluoroacetic acid. The resulting solution is allowed to stand at 25° C. for 16 hours, during which time dicyclohexylurea precipitates from the solution. Then, 100 ml. of ethyl acetate and a solution of 2.6 g. of oxalic acid in 10 ml. of methanol are added and the resulting mixture is allowed to stand at 25° C. for an additional one hour. The dicyclohexylurea is removed by filtration and washed thoroughly with several portions of ethyl acetate. The combined filtrate and ethyl acetate washings are washed several times with water to remove the dimethyl sulfoxide, and the organic layer is then dried over magnesium sulfate and evaporated to dryness to yield a residue. The residue is chromatographed on a 50 cm. x 5 cm. column containing 400 g. of silica gel in chloroform. Benzaldehyde eliminated by the action of silica gel is eluted with eight liters of chloroform during a period of 72 hours. Subsequently, a saturated aldehyde component containing 2′,3′-O-benzylideneuridine-5′-aldehyde and 1-(2′,3′-O-benzylidene-α-L-dialdoyxofuranosyl)uracil is eluted from the column with four liters of isopropanol:chloroform (1:9). Finally, 3-deoxyuridin-3′-en-5′-aldehyde is eluted from the column with two liters of methanol:chloroform (1:5).

In a similar manner, by repeating the above procedure with one exception, namely substituting first 2′,3′-O-benzylidenecytidine, second 1-(2′,3′-O-benzylidene-β-D-ribofuranosyl)thymine, next 2′,3′-O-benzylidenedenosine, and then 2′,3′-O-benzylideneguanosine for 2′,3′-O-benzylideneuridine, there are obtained 3′-deoxycytidin-3′-en-5′-aldehyde, 1-(3′-deoxy-β-D-glycero-dialdopent-3′-enofuranosyl)thymine, 3′-deoxyadenosine-3′-en-5′-aldehyde, and 3′-deoxyguanosine-3′-en-5′-aldehyde, respectively.

Example 2

A mixture of 0.23 g. of 3′-deoxyuridin-3′-en-5′-aldehyde and 35 mg. of sodium borohydride in 10 ml. of methanol is allowed to stand at 25° C. for 30 minutes. The reaction mixture is passed through a 10 cm. x 1 cm. column containing 15 g. of an acid-form resin of polyacrylic acid cross-linked with 10% divinylbenzene, and the product is eluted with methanol. The eluate is collected and evaporated to dryness under reduced pressure to yield 3-deoxyuridin-3′-ene which is recrystallized from ethanol.

In a similar manner, by repeating the above procedure with one exception, namely substituting first 3′-deoxycytidin-3′-en-5′-aldehyde, second 1-(3′-deoxy-β-D-glycero-dialdopent-3′-enofuranosyl)thymine, next 3′-deoxyguanosin-3′-en-5′-aldehyde for 3′-deoxyuridin-3′-en-5′-aldehyde, there are obtained 3′-deoxycytidin-3′-ene, 1-(3′-deoxy-β-D-glycero-pent-3′-enofuranosyl)thymine, 3′-deoxyadenosin-3′-ene, and 3′-deoxyguanosin-3′-ene, respectively.

Example 3

A solution of 3.5 g. of 2′,3′-O-benzylideneadenosine-5′-aldehyde (prepared by the oxidation of the corresponding nucleoside with dimethyl sulfoxide, dicyclohexylcarbodiimide and acid in accordance with the method as described in U.S. Patent 3,248,380) in 100 ml. of isopropanol previously cooled to 0° C., is added 10 ml. of a 1 N solution of sodium isopropoxide in isopropanol. The reaction mixture is allowed to stand at 0° C. for 30 minutes and is then neutralized by the addition of an acid-form resin (sulfonated polystyrene beads cross-linked with 8% vinyl benzene). The resin is removed by filtration and washed with several portions of isopropanol. The combined filtrate and washings are evaporated to dryness under reduced pressure to yield a residue. The residue is dissolved in 10 ml. of methanol and chromatographed on six 1 meter x 20 cm. glass plates coated with a 1.3 mm. layer of silica gel. The plates are developed in methanol:chloroform (1:4), and a main ultraviolet absorbing product is eluted from the plates with methanol. After removing the methanol, the product is recrystallized from ethanol to yield 3′-deoxy-adenosin-3′-en-5′-aldehyde.

In a similar manner, by repeating the above procedure with one exception, namely substituting first 2′,3′-O-benzylideneuridine-5′-aldehyde, second 2,3′-O-benzylidenecytidine-5′-aldehyde, next 1-(2′,3′-O-benzylidene-β-D-dialdoribofuranosyl)thymine, and then 2′,3′-O-benzylideneguanosine-5′-aldehyde for 2′,3′-O-benzylideneadenosine-5′-aldehyde, there are obtained 3′-deoxyuridin-3′-en-5′-aldehyde, 3′-deoxycytidin-3′-en-5′-aldehyde, 1-(3′-deoxy-β-D-glycero-dialdopent - 3′ - enofuranosyl)thymine, and 3′-deoxyguanosin-3′-en-5′-aldehyde, respectively.

In a similar manner, by repeating the above procedure with each of the above starting materials and substituting first sodium carbonate in dimethylformamide, second potassium t-butoxide in t-butanol and next potassium t-butoxide in dimethyl sulfoxide for the potassium isopropoxide in isopropanol, there are obtained each of the above final products.

Example 4

The saturated aldehyde component, obtained from Example 1, containing 2′,3′-O-benzylideneuridine-5′-aldehyde and 1-(2′,3′-O-benzylidene-α-L-dialdolyxofuranosyl)uracil and 0.1 g. of sodium borohydride in 50 ml. of ethanol is held at 25° C. for 30 minutes. The excess reagent is decomposed and the pH is adjusted to 7 by the dropwise addition of acetic acid. The mixture is then extracted with several portions of ethyl acetate. The combined ethyl acetate extracts are washed with aqueous sodium bicarbonate solution, water and then dried over magnesium sulfate. The solvent is removed under reduced pressure to yield a white solid which is redissolved in 20 ml. of ethyl acetate and chromatographed on two 1 meter x 20 cm. glass plates coated with a 1.3 mm. layer of silica gel, using carbon tetrachloride:acetone (1:1) as eluant. Two ultraviolet absorbing products are eluted from the plates with acetone. After removing the acetone, the faster moving product is recrystallized from aqueous ethanol to yield 2′,3′-O-benzylideneuridine. After removing the acetone, the slower moving product is recrystallized from aqueous ethanol to yield 1-(2′,3′-O-benzylidene-α-L-lyxofuranosyl)uracil.

A solution of 0.25 g. of 1-(2′,3′-O-benzylidene-α-L-lyxofuranosyl)uracil in 50 ml. of 80% acetic acid is heated at 100° C. for one hour. The solvent is then removed by evaporation under reduced pressure, and the residue partitioned between 25 ml. of water and 25 ml. of ethyl acetate. The aqueous layer is extracted with a second 25 ml. portion of ethyl acetate and then evaporated to dryness under reduced pressure to yield 1-(α-L-lyxofuranosyl)uracil which is further purified by recrystallization from methanol.

In a similar manner, by repeating the above procedure with the saturated aldehyde components obtained in each of the other reactions in Example 1, there are obtained 1-(α-L-lyxofuranosyl)cytosine, 1-(α-L-lyxofuranosyl)thymine, 9-(α-L-lyxofuranosyl)adenine, and 9-(α-L-lyxofuranosyl)guanine, respectively.

Example 5

A mixture of 1 g. of 1-(α-L-lyxofuranosyl)uracil, 1 g. of freshly fused zinc chloride and 7.5 ml. of anisaldehyde is agitated at 25° C. for 48 hours. To the reaction mixture is then added 100 ml. of water and 100 ml. of ether, and a resulting precipitate is removed by filtration, washed with water, and then ether to yield 1-(2′,3′-O-p-anisylidene - α - L - lyxofuranosyl)uracil which is recrystallized from aqueous ethanol.

To a solution of 0.36 g. of 1-(2′,3′-O-p-anisylidene-α-L-lyxofuranosyl)uracil in 3 ml. of anhydrous dimethyl sulfoxide are added 0.62 g. of dicyclohexylcarbodiimide, 0.08 ml. of pyridine and 0.04 ml. of trifluoroacetic acid. The resulting solution is allowed to stand at 25° C. for six hours, during which time dicyclohexylurea precipitates from the solution. Then 10 ml. of ethyl acetate and a solution of 0.26 g. of oxalic acid in 1 ml. of methanol are added, and the resulting mixture is allowed to stand at 25° C. for an additional one hour. The dicyclohexylurea is removed by filtration and washed thoroughly with several portions of ethyl acetate. The combined filtrate and ethyl acetate washings are washed several times with water, and the organic layer is dried over magnesium sulfate and evaporated to dryness to yield crude 1-(2′,3′O-anisylidene-α-L-dialdolyxopentofuranosyl)uracil.

A solution of the latter compound in 20 ml. of 80% acetic acid is heated at 37° C. for 16 hours. The solvent is then removed by evaporation under reduced pressure and the residue is partitioned between 20 ml. of water and 20 ml. of ethyl acetate. The aqueous layer is separated, evaporated to dryness under reduced pressure and chromatographed on a 1 meter x 20 cm. glass plate coated with a 1.3 mm. layer of microcrystalline cellulose. After development of the plate in the solvent mixture isopropanol:ammonia:water (7:1:2), the main ultraviolet absorbing band is eluted with water. The aqueous solution is then lyophilized to yield 1-(α-L-dialdolyxopentofuranosyl)uracil as a white powder.

In a similar manner, by repeating the above procedure with one exception, namely substituting first 1-(α-L-lyxofuranosyl)cytosine, second 1 - (α - L - lyxofuranosyl)thymine, next 9-(α-L-lyxofuranosyl)adenine, and then 9-(α-L-lyxofuranosyl)guanine for 1-(α-L-lyxofuranosyl)uracil, there are obtained 1-(α-L-dialdolyxopentofuranosyl)cytosine, 1-(α-L-dialdolyxopentofuranosyl)thymine, 9-(α-L-dialdolyxopentofuranosyl)adenine, and 9-(α-L-dialdolyxopentofuranosyl)guanine, respectively.

Example 6

A solution of 0.25 g. of 3′-deoxyadenosin-3′-en-5′-aldehyde in 25 ml. of water and 25 ml. of methanol is hydrogenated in the presence of 0.1 g. of a pre-hydrogenated 10% palladium-barium sulfate catalyst under a slight positive pressure of hydrogen at 25° C. for two hours. The catalyst is then removed by filtration through diatomaceous earth and washed with several portions of methanol. The combined filtrate and washings are evaporated under reduced pressure to yield a residue containing a mixture of 9 - (3′ - deoxy - β - D - erythro - dialdopentofuranosyl)-adenine and 9-(3′-deoxy-α-L-threo-dialdopentofuranosyl)adenine.

In a similar manner, by repeating the above procedure with one exception, namely substituting first 3′-deoxyuridin-3′-en-5′-aldehyde, second 3′-deoxycytidin-3′-en-5′-aldehyde, next 1-(3′-deoxy-β-D-glycero-dialdopent-3′-enofuranosyl)thymine, and then 3′-deoxyguanosin-3′-en-5′-aldehyde for 3′-deoxyadenosin-3′-en-5′-aldehyde, there are obtained first a mixture of 1-(3′-deoxy-β-D-erythro-dialdopentofuranosyl)uracil and 1-(3′-deoxy-α-L-threo-dialdopentofuranosyl)uracil, second a mixture of 1-(3′-deoxy-β-D-erythro-dialdopentofuranosyl)cytosine and 1-(3′-deoxy-α-L-threo-dialdopentofuranosyl)cytosine, next a mixture of 1-(3′-deoxy-β-D-erythro-dialdopentofuranosyl)thymine and 1 - (3′ - deoxy - α - L - threo - dialdopentofuranosyl)thymine, and then a mixture of 9-(3′-deoxy-β-D-erythro-dialdopentofuranosyl)guanine and 9-(3′-deoxy-α-threo-dialdopentofuranosyl)guanine, respectively.

Example 7

A solution of the residue, obtained in Example 6, in 10 ml. of methanol is added to an ice-cooled solution of 25 mg. of sodium borohydride in 10 ml. of methanol and the mixture is allowed to stand at 25° C. for 30 minutes. The reaction mixture is then neutralized by the addition of an acid-form resin of polyacrylic acid cross-linked with 10% divinyl benzene. The resin is then removed by filtration and washed with several portions of methanol. The combined filtrate and washings are evaporated to dryness under reduced pressure to yield a residue. The residue is redissolved in methanol and re-evaporated several times. The residue is then dissolved in 20 ml. of water:methanol (7:3) and chromatographed on a 25 cm. x 2 cm. column containing 75 ml. of an hydroxide-form resin of a quaternary ammonium hydroxide substituted polystyrene cross-linked with 2% divinyl benzene. The column is then eluted with two liters of water:methanol (7:3) to afford two products. After removing the solvent from the faster moving product, there is obtained 3′-deoxyadenosine. After removing the solvents from the slower moving product, there is obtained 9-(3′-deoxy-α-L-threo-pentofuranosyl)adenine.

In a similar manner, by repeating the above procedure with the mixture of 1-(3′-deoxy-β-D-erythro-dialdopentofuranosyl)cytosine and 1-(3′-deoxy-α-L-threo-dialdopentofuranosyl)cytosine obtained in Example 6, there is obtained 1-(3′-deoxy-α-L-threo-pentofuranosyl)cytosine.

In a similar manner, by repeating the above procedure with the other mixtures of products obtained in Example 6, with one exception, namely eluting with water:methanol(7:3) containing 0.4 M trifluoroethanol and 0.15 M triethylamine for water:methanol (7:3), there are obtained 1-(3′-deoxy-α-L-threo-pentofuranosyl)uracil, 1-(3′-deoxy-α-L-threo-pentofuranosyl)thymine and 9-(3′-deoxy-α-L-threo-pentofuranosyl)guanine.

Example 8

By repeating the procedure of Example 6 with the following starting materials, namely 3′-deoxyuridin-3′-ene, 3′ - deoxycytidin - 3′ - ene, 1 - (3′ - deoxy - β - D - glyceropent - 3′ - enofuranosyl)thymine, 3′ - deoxyadenosin - 3′ - ene, and 3′-deoxyguanosin-3′-ene there are obtained a mixture of 3′-deoxyuridine and 1-(3′-deoxy-α-L-threo-pentofuranosyl)uracil, a mixture of 3′-deoxycytidine and 1-(3′-deoxy-α-L-threo-pentofuranosyl)cytosine, a mixture of 1-(3′-deoxy-β-D-erythro-pentofuranosyl)thymine and 1-(3′-deoxy-α-L-threo-pentofuranosyl)thymine, a mixture of 3′-deoxyadenosine and 1-(3′-deoxy-α-L-threo-pentofuranosyl)adenine, and a mixture of 3′-deoxyguanosine and 1 - (3′ - deoxy - α - L - threo - pentofuranosyl)guanine, respectively.

By repeating the chromatographic procedure as described in Example 7, with the above mixtures, there are obtained 1-(3′-deoxy-α-L-threo-pentofuranosyl)uracil, 1-(3′-deoxy-α-L-threo-pentofuranosyl)cytosine, 1-(3-deoxy-α-L-threo-pentofuranosyl)thymine, 9-(3′-deoxy-α-L-threo-pentofuranosyl)adenine, and 9-(3′-deoxy--L-threo-pentofuranosyl)guanine, respectively.

What is claimed is:

1. A compound selected from the group consisting of 3′-deoxyribonucleoside - 3′ - en - 5′ - aldehydes, 3′-deoxyribonucleoside - 3′ - enes, α-L-lyxonucleoside - 5′ - aldehydes, α-L-lyxonucleosides, (3′-deoxy-α-L-threo-dialdopentofuranosyl)nucleosides, and (3′ - deoxy-α-L-threo-pentofuranosyl)nucleosides, having the formulas:

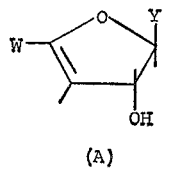   and   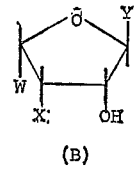

(A)         (B)

wherein

W is formyl or hydroxymethyl;
X is hydroxy or hydrogen; and
Y is a pyrimidine or purine base.

2. A compound according to claim 1 wherein Y is selected from the group consisting of uracil-1-yl, cytosin-1-yl, 4-chloro-1,2-dihydropyrimidin-2-on-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 4-chloro-6-aza-1,2-dihydropyrimidin-2-on-1-yl, 6-azathymin-1-yl, hypoxanthin-9-yl, adenin-9-yl, 6-dimethylaminopurin-1-yl, 6-chloropurin-9-yl, guanin-9-yl, xanthin-9-yl, 2,6-dichloropurin-9-yl, 2,6-bis(methylamino)purin-9-yl, 8-azaadenin-9-yl, and 8-azaguanin-9-yl.

3. A compound according to Formula A of claim 2 wherein W is formyl and Y is selected from the group consisting of uracil-1-yl, cytosin-1-yl, thymin-1-yl, adenin-9-yl, and guanin-9-yl.

4. A compound according to Formula A of claim 2 wherein W is hydroxymethyl; and Y is uracil-1-yl.

5. A compound according to Formula A of claim 2 wherein W is hydroxymethyl; and Y is cytosin-1-yl.

6. A compound according to Formula A of claim 2 wherein W is hydroxymethyl; and Y is thymin-1-yl.

7. A compound according to Formula A of claim 2 wherein W is hydroxymethyl; and Y is adenin-9-yl.

8. A compound according to Formula A of claim 2 wherein W is hydroxymethyl; and Y is guanin-9-yl.

9. A compound according to Formula B of claim 2 wherein W is hydroxymethyl; X is hydroxy; and Y is uracil-1-yl.

10. A compound according to Formula B of claim 2 wherein W is hydroxymethyl; X is hydroxy; and Y is cytosin-1-yl.

11. A compound according to Formula B of claim 2 wherein W is hydroxymethyl; X is hydroxy; and Y is thymin-1-yl.

12. A compound according to Formula B of claim 2 wherein W is hydroxymethyl; X is hydroxy; and Y is adenin-9-yl.

13. A compound according to Formula B of claim 2 wherein W is hydroxymethyl; X is hydroxy; and Y is guanin-9-yl.

14. A compound according to Formula B of claim 2 wherein W is hydroxymethyl; X is hydrogen; and Y is uracil-1-yl.

15. A compound according to Formula B of claim 2 wherein W is hydroxymethyl; X is hydrogen; and Y is cytosin-1-yl.

16. A compound according to Formula B of claim 2 wherein W is hydroxymethyl; X is hydrogen; and Y is thymin-1-yl.

17. A compound according to Formula B of claim 2 wherein W is hydroxymethyl; X is hydrogen; and Y is adenin-9-yl.

18. A compound according to Formula B of claim 2 wherein W is hydroxymethyl; X is hydrogen; and Y is guanin-9-yl.

19. 1-(3'-deoxy-$\beta$-D-erythro-pentofuranosyl)thymine.

20. A process for the preparation of a 3'-deoxyribonucleoside-3'-en-5'-aldehyde which comprises treating a ribonucleoside-5'-aldehyde containing an acetal or ketal protecting group at the 2'- and 3'-hydroxy groups, with a basic solution to obtain the corresponding 3'-deoxyribonucleoside-3'-en-5'-aldehyde.

21. A process according to claim 20 wherein the basic solution is selected from the group consisting of sodium carbonate in dimethylformamide, potassium t-butoxide in t-butanol, sodium isopropoxide in isopropanol, and potassium t-butoxide in dimethyl sulfoxide.

22. A process for the preparation of an epimeric mixture of a (3'-deoxy-$\beta$-D-erythro-dialdopentofuranosyl)nucleoside and a (3'-deoxy-$\alpha$-L-threo-dialdopentofuranosyl)nucleoside which comprises catalytically hydrogenating a 3'-deoxyribonucleoside-3'-en-5'-aldehyde in the presence of a palladium catalyst on an inert support and in an inert solvent.

23. The process according to claim 22 wherein said 3'-deoxyribonucleoside-3'-en-5'-aldehyde is selected from the group consisting of 3'-deoxyuridin-3'-en-5'-aldehyde, 3'-deoxycytidin-3'-en-5'-aldehyde, 1-(3'-deoxy-$\beta$-D-glycero-dialdopent-3'-enuofuranosyl)thymine, 3'-deoxyadenosin-3'-en-5'-aldehyde, and 3'-deoxyguanosin-3'-en-5'-aldehyde; said palladium catalyst on an inert support is 10% palladium-barium sulfate catalyst; and said inert solvent is water:methanol.

References Cited
UNITED STATES PATENTS

| | | | |
|---|---|---|---|
| 3,201,388 | 8/1965 | Tsuchiya et al. | 260—211.5 |
| 3,337,530 | 8/1967 | Hanze | 260—211.5 |
| 3,346,560 | 10/1967 | Boxer | 260—211.5 |
| 3,346,561 | 10/1967 | Boxer et al. | 260—211.5 |

LEWIS GOTTS, Primary Examiner

JOHNNIE R. BROWN, Assistant Examiner

U.S. Cl. X.R.

260—999